United States Patent [19]

Suzuki et al.

[11] Patent Number: 4,593,297
[45] Date of Patent: Jun. 3, 1986

[54] HALFTONE IMAGE RECORDING SYSTEM
[75] Inventors: Koichi Suzuki, Yokohama; Noboru Murayama, Tokyo, both of Japan
[73] Assignee: Ricoh Company, Ltd., Tokyo, Japan
[21] Appl. No.: 631,203
[22] Filed: Jul. 16, 1984
[30] Foreign Application Priority Data
Jul. 20, 1983 [JP] Japan .................................. 58-132187
[51] Int. Cl.⁴ ...................... G01D 15/14; H04N 1/40; H04N 1/21
[52] U.S. Cl. .................................... 346/160; 358/283; 358/298
[58] Field of Search ................ 346/108, 160; 358/283, 358/298, 299, 300, 302

[56] References Cited
U.S. PATENT DOCUMENTS
4,084,259 4/1978 Cahill et al. .................... 358/298 X
4,365,275 12/1982 Berman et al. ...................... 358/283
4,468,706 8/1984 Cahill .............................. 358/298 X FOREIGN PATENT DOCUMENTS
57-91074 6/1982 Japan .

Primary Examiner—E. A. Goldberg
Assistant Examiner—Linda M. Peco
Attorney, Agent, or Firm—Oblon, Fisher, Spivak, McClelland & Maier

[57] ABSTRACT

A halftone image recording system for an electrophotographic apparatus which records a halftone image of input image data using black dots and white dots. Various different densities are rendered by various different gradation density patterns each of which is determined by a number of black dots or that of white dots in a two-dimensional dot matrix and a direction of arrangement of the black or white dots.

2 Claims, 13 Drawing Figures 0.368

0.766

0.953

1.082

1.164

1.352

1.480

1.717

HALFTONE IMAGE RECORDING SYSTEM

BACKGROUND OF THE INVENTION

1. Field of the Invention

The present invention relates to a halftone image recording system for an electrophotographic recording apparatus which records halftone images by black and white dots.

2. Discussion of Background

In a prior art halftone image recording system of the type employing black and white dots, a two-dimensional dot matrix is used as a unit and the number of black dots in the dot matrix is changed to render various densities. The problem encountered with this type of system is that a halftone image with multiple gradations cannot be recorded without increasing the size of the dot matrix and, therefore, without lowering the resolution or increasing the recording time.

The problem stated above may be solved by a system known by the name of Mead system and disclosed in Japanese Patent Laid-Open Publication No. 57-91074. What characterizes the Mead system is the utilization of the effect of overlaying, in detail, reproducing multiple gradations by combining a gradation provided by a number of dots and that provided by overlapping portions of dots. The Mead system, however, is unsuitable for rendering halftone in a low density range and, moreover, it cannot be applied to a raster scan type electrophotographic recording apparatus in which a positive latent image is produced by erasing electrostatic charge in non-image areas of the surface of a photoconductive element.

SUMMARY OF THE INVENTION

It is therefore an object of the present invention to provide a new halftone image recording system for an electrophotographic recording apparatus which eliminates the drawbacks inherent in the prior art systems as discussed above and records halftone images with excellent resolution.

It is another object of the present invention to provide a halftone image recording system for an electrophotographic recording apparatus which is applicable even to a raster scan type recording apparatus which forms a positive latent image by erasing electrostatic charge in non-image areas of the surface of a photoconductive element by means of a laser beam or the like.

It is another object of the present invention to provide a generally improved halftone image recording system for an electrophotographic recording apparatus.

In a halftone image recording system for an electrophotographic recording apparatus which records a halftone image of input image data by black dots and white dots, the present invention provides an improvement wherein a plurality of different densities are rendered on a two-dimensional dot matrix basis by using a plurality of different gradation density patterns. Each of the gradation density patterns is determined by a number of at least either one of the black dots and white dots and a direction of arrangement of the one of the black dots and white dots in the two-dimensional dot matrix.

In a preferred embodiment, the one of black dots and white dots are the black dots. The direction of arrangement of the black dots includes at least one of a horizontal direction, a vertical direction and an oblique direction.

Preferably, each of the gradation density patterns in the dot matrix is formed by the black dots a number of which is one to three.

The gradation density patterns may be eight different patterns representative of different densities.

The electrophotographic recording apparatus may comprise a laser plotter which forms a latent image of the input image data such that a non-image region of the latent image is rendered by the white dots and an image region is rendered by the black dots.

The above and other objects, features and advantages of the present invention will become apparent from the following detailed description taken with the accompanying drawings.

DESCRIPTION OF THE PREFERRED EMBODIMENT

While the halftone image recording system of the present invention is susceptible of numerous physical embodiments, depending upon the environment and requirements of use, a substantial number of the herein shown and described embodiments have been made, tested and used, and all have performed in an eminently satisfactory manner.

Figure 2:
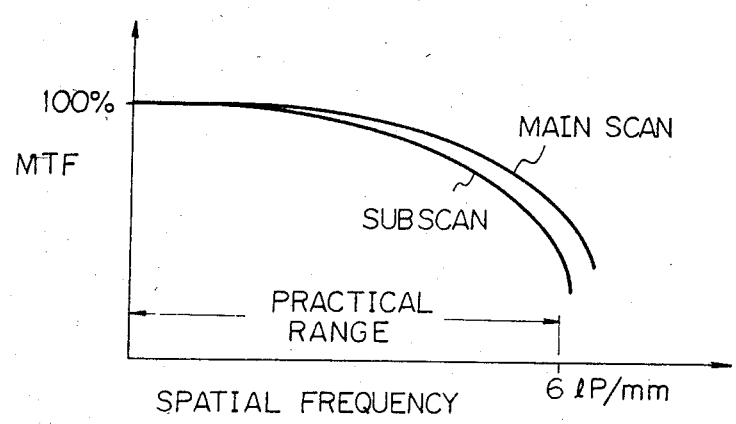
FIG. 2 is a graph showing a modulation transfer function (MTF) characteristic.

As shown in FIG. 2, the modulation transfer function (MTF) of an image recorded by a dot printer or a plotter decreases with the increasing spatial frequency. Generally, a dot printer or a plotter has MTF characteristics in the main scan direction and the subscan direction which are different from each other, whatever the recording system may be. The present invention has been elaborated paying attention to such a difference in MTF characteristic between the main scan direction and the subscan direction.

Before entering into detailed description of the present invention, the principle thereof will be discussed in conjunction with, for example, a raster scan type electrophotographic recording apparatus which produces a positive latent image by erasing electrostatic charge in non-image areas of the surface of a uniformly charged photoconductive element (hereinafter referred to as a "laser plotter").

Figure 1A:
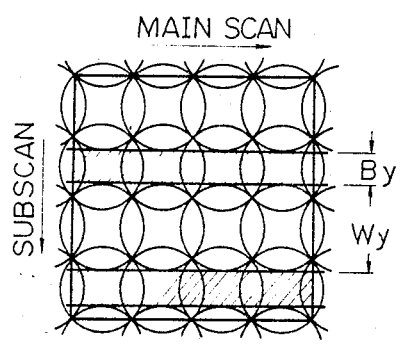
FIGS. 1A and 1B show exemplary stripe patterns recorded by a laser plotter.
Figure 1B:
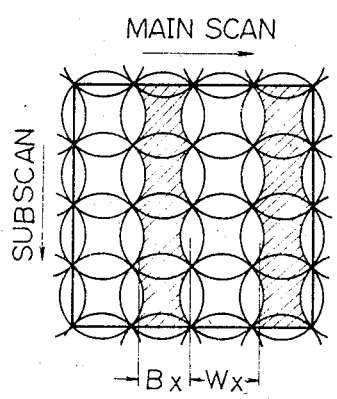

Referring to FIGS. 1A and 1B, there are shown different examples of latent images each representing a black and white stripe pattern to be recorded. Circles in these drawings indicate the charge erased regions corresponding to points on coordinates which are set at pitches p to the reciprocal numbers of recording dot densities, while hatched regions represent positive latent images, or black regions.

In the stripe pattern shown in FIG. 1A, the widths By and Wy of the black and white lines are expressed respectively as $$By = (n + 1 - \sqrt{2})p$$

$$Wy = (n - 1 + \sqrt{2})p$$

where n is a number of dots or points and p is a dot pitch.

In the stripe pattern of FIG. 1B, on the other hand, the widths Bx and Wx of the black and white lines are produced respectively by $$Bx = \left(n + \frac{\pi - 2}{4}\right)p$$

$$Wx = \left(n - \frac{\pi - 2}{4}\right)p$$

The width By is smaller than the width Bx so that the stripe pattern in the subscan direction in FIG. 1A has a higher spatial frequency than the stripe pattern in the main scan direction in FIG. 1B. The resulting MTF characteristics in the respective directions are shown in FIG. 2.

Figure 3:
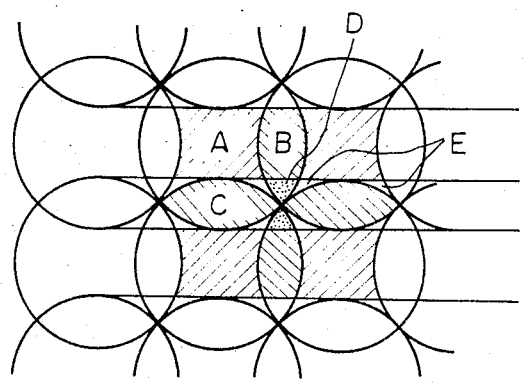
FIG. 3 shows a latent image pattern formed by an arrangement of nearby non-erased points in a laser plotter.
Figure 4A:
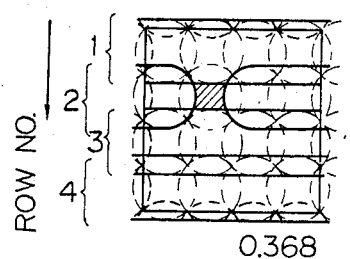
FIGS. 4A–4H show various examples of gradation density patterns in accordance with the present invention.
Figure 4B:
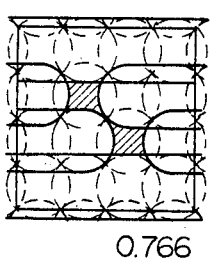
Figure 4C:
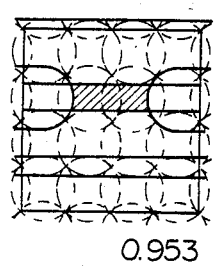
Figure 4D:
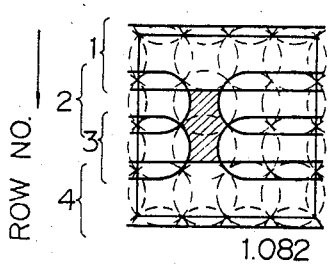
Figure 4E:
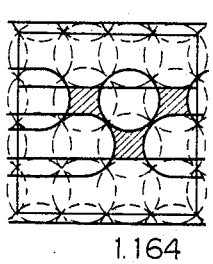
Figure 4F:
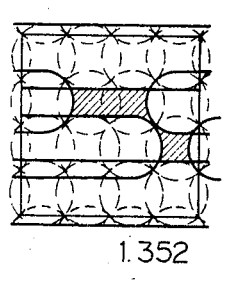
Figure 4G:
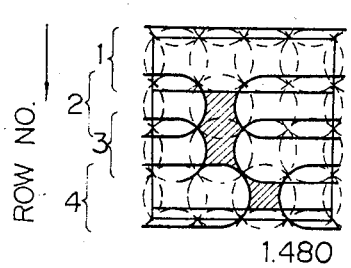
Figure 4H:
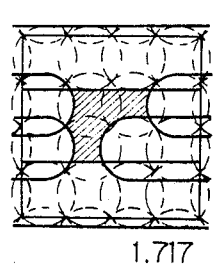

Now, a latent image pattern consisting of an array of nearby non-erased points may be decomposed into five elements A, B, C, D and E as shown in FIG. 3. A latent image in the form of an array of neighboring non-erased points has any of five different constructions:

(1) 2A+B when arranged horizontally;
 (2) 2A+C+4E when arranged vertically;
 (3) 2A+2E when arranged obliquely;
 (4) 3A+B+C+D+5E when arranged horizontally and vertically; and
 (5) 4A+2B+2C+2D+8E when arranged horizontally, vertically and obliquely.

That is, not only the number of dots but also the direction of dot arrangement have decisive influence on the size of a latent image pattern. This implies that in a dot matrix having a certain size a density can be rendered utilizing both the number of dots and the direction of dot arrangement.

With the above principle in mind, a preferred embodiment of the present invention will be described.

FIG. 4 shows examples of gradation density patterns each being formed in a 4×4 dot matrix which is applicable to a laser plotter. In FIG. 4, the hatched regions represent points where electrostatic charge has not been erased, or non-erased points (black dots). As shown, despite that the number of non-erased points is one to three, eight different density patterns are attained. Using such density patterns, there can be recorded halftone images with plentiful gradations. Further, the size of the dot matrix is small enough for the apparent resolution of recorded images to become higher.

Figure 5:
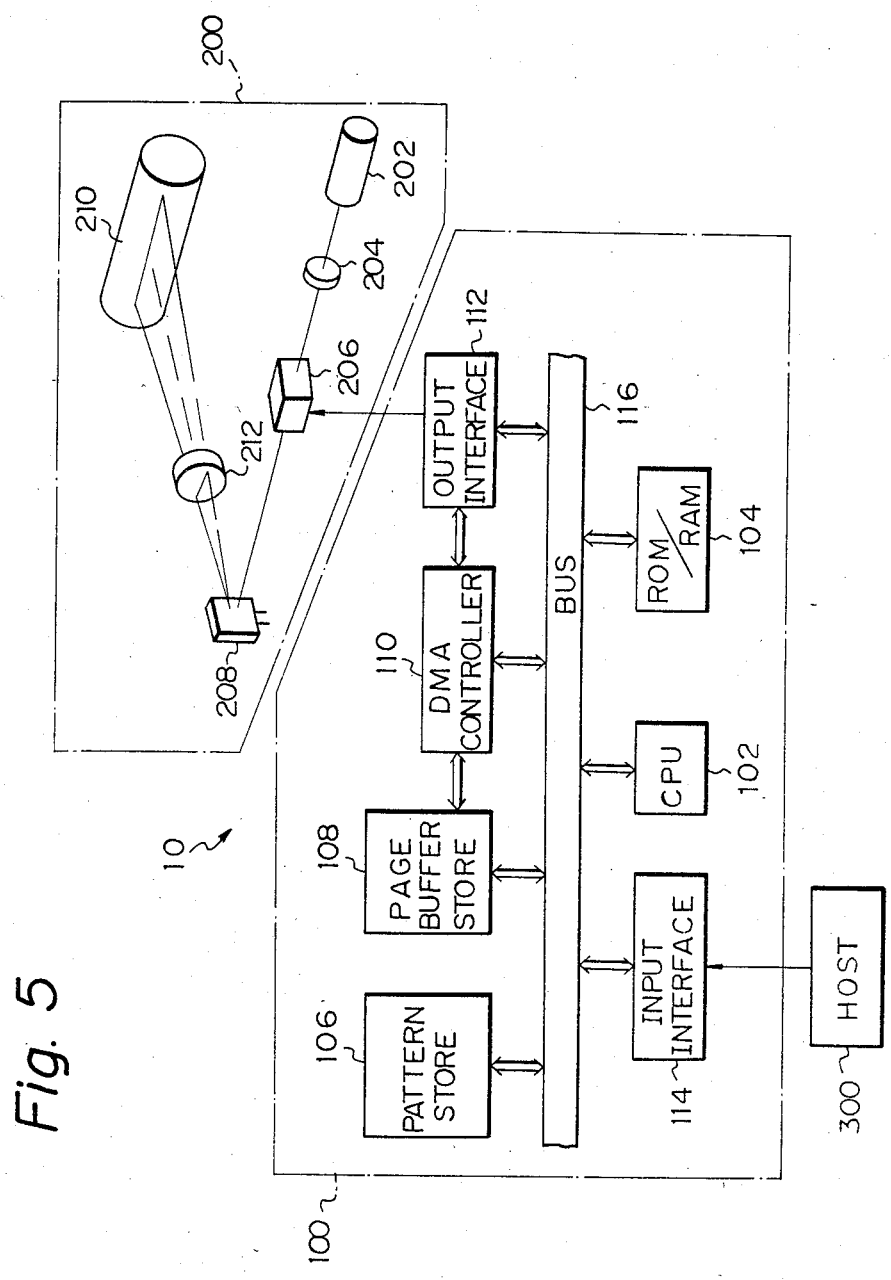
FIG. 5 schematically shows a construction of a laser plotter constructed in accordance with the present invention.

Referring to FIG. 5, a laser plotter to which the present invention is applied is shown. The laser plotter, generally 10, comprises a controller section 100 and a recorder section 200 which are constructed as a microcomputer system.

The controller section 100 includes a CPU 102 adapted for system control. A ROM/RAM unit 104 is made up of a read only memory (ROM) storing a control program and a random access memory (RAM) serving as a work memory for the CPU 102. A pattern store 106 comprises a ROM unit which stores character patterns and the gradation density patterns shown in FIGS. 4A–4H. A page buffer store 108 comprises a RAM for storing one page of bit images. A direct memory access (DMA) controller 110 is adapted for fast transfer of image data from the page buffer store 108 to the recorder section 200. An output interface 112 includes a parallel-to-serial conversion register and serves to deliver image data to the recorder section 200 as serial data. The controller section 100 is supplied with data from a host 300 at an input interface 114 thereof. All the units in the controller section 114 are connected to a system bus 116.

The recorder section 200, on the other hand, includes a laser tube 202. A laser beam issuing from the laser tube 202 is shaped by a collimator 204 and, then, incident to an AO modulator 206. The AO modulator 206 selectively intercepts the laser beam directed toward a deflector 208 in response to image data which are applied thereto from the controller section 100. The deflector 208 deflects the incident laser beam so that the laser beam is caused to scan a photoconductive drum 210 axially over a necessary width. An F-θ lens 212 is interposed between the deflector 208 and the drum 210 in order to compensate for distortion of the spot shape of the scanning beam on the drum 210 as well as irregularity in scanning rate. Although not shown in the drawing, the recorder section 200 includes other various devices such as a charger for charging the surface of the drum 210, a developing device for developing a latent image formed on the drum 210, sheet feed and sheet discharge mechanisms, an image transferring device, a cleaning or charge dissipating device, a fixing device, and a device for controlling the rotation of the drum 210, movement of the deflector 208 and other motions.

In operation, when data is supplied from the host 300 to the controller 100 via the input interface 114, the CPU 102 decodes it in accordance with the control program. If the input data is a character code, the CPU 102 gets a character pattern associated with the character code out of the pattern store 106 and develops it in the page buffer store 108. If the input data is a gradation code indicative of halftone, the CPU 102 gets a gradation density pattern associated with the gradation code out of the pattern store 106 and develops it in the page buffer store 108. Further, if the input data is a bit image, the CPU 102 writes it directly in the page buffer store 108.

In the case where the data input to the controller 100 is a control command, the CPU 102 executes a program designated by the control command. For example, in response to a print-out command, the CPU 102 activates the DMA controller 110 so that the image pattern data developed in the page buffer store 108 are DMA-transferred to the recorder 200 via the output interface 112. The AO modulator 206 in the recorder 200 modulates the laser beam issuing from the laser tube 202 in response to image pattern data supplied from the controller 100, thereby forming a positive latent image from the drum 210. If the print-out command accompanies a command indicative of a particular number of sheets to be produced, the CPU causes the image pattern data to be continuously fed out until images equal in number to the specified sheets have been recorded.

While various other controls such as erasing the pager buffer store 108 and writing additional data thereinto are possible, they are common to conventional ones and, therefore, description thereof will be omitted for simplicity.

The present invention has been shown and described taking a laser plotter for example. In a dot printer or a plotter, the MTF characteristic in the main scan direction generally differs from that in the subscan direction, whatever the image recording process may be. In this respect, the present invention is generally applicable not only to a laser beam plotter but also to a wire dot printer, an ink jet printer, and an LED printer, LC light valve printer or like electrophotographic printer.

In summary, it will be seen that the present invention provides a halftone image recording system which can record halftone images with plentiful gradations inclusive of low densty regions, make a dot martix sufficiently small size and, thereby, increase the apparent resolution, and record halftone images even in a raster scan type electrophotographic apparatus which produces a positive latent image by erasing electrostatic charge in non-image regions of the surface of a photoconductive element by means of a laser beam or the like. All these advantages are achieved by rendering various densities based on a combination of a number of black or white dots in a dot matrix and a direction of arrangement thereof, paying attention to the fact that the MTF characteristics of a black/white dot type recording apparatus in the main scan direction and the subscan direction are not identical with other even if the recording density is the same.

Various modifications will become possible for those skilled in the art after receiving the teachings of the present disclosure without departing from the scope thereof.

What is claimed is:

1. In a halftone image recording system for an electrophotographic recording apparatus which records a halftone image of input image data by black dots and white dots, the improvement wherein a plurality of different densities are rendered on a two-dimensional dot matrix basis by using a plurality of different gradation density patterns, each of said gradation density patterns being determined by a numer of at least either one of the black dots and white dots and a direction of arrangement of said one of the black and white dots in said two-dimensional dot matrix.

2. The improvement as claimed in claim 1, in which the electrophotographic recording apparatus comprises a laser plotter which forms a latent image of the input image data such that a non-image region of said latent image is rendered by the white dots and an image region is rendered by the black dots.

* * * * *